Dec. 30, 1924.
H. WITTEMEIER
FILTER FOR PURIFYING THE AIR
Original Filed Jan. 5, 1921
1,521,577
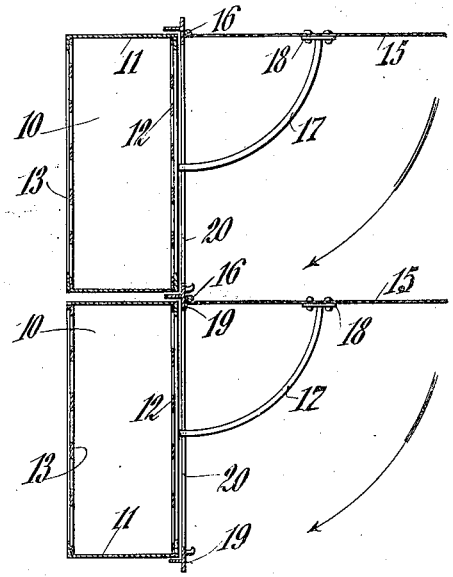
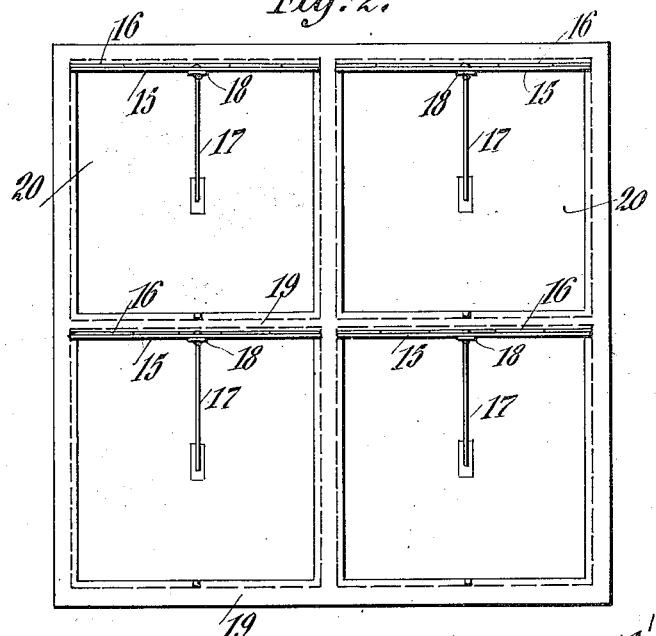
INVENTOR
Hans Wittemeier
BY C. P. Goepel.
ATTORNEY Patented Dec. 30, 1924.

1,521,577

UNITED STATES PATENT OFFICE.

HANS WITTEMEIER, OF BERLIN, GERMANY.

FILTER FOR PURIFYING THE AIR.

Original application filed January 5, 1921, Serial No. 435,288. Divided and this application filed March 15, 1924. Serial No. 699,598.

*To all whom it may concern:*

Be it known that I, HANS WITTEMEIER, a citizen of Germany, and a resident of Berlin, Germany, have invented certain new and useful Improvements in Filters for Purifying the Air, of which the following is a specification.

In many technical processes and plants the purification of the air plays an important part. In heating and ventilating plants the cleaning of the air is necessary for hygienic reasons; in turo-generators, compressors and the like the air must be deprived of dust in order to secure their reliability of operation which would be impaired by dirt that would rapidly collect in sensitive parts of the machine.

An object of this invention is to provide a filter frame for receiving filter elements of standardized construction, with a closure flap or valve which may be opened merely by placing the filter element in position in the frame, and which may automatically close when the filter element is removed; the means for operating the flap or valve being wholly independent of the filter element and requiring no additions, projections or peculiar constructions of the filter element so that the valve device may be used with and operated by the standard filter element.

Another object is to provide a closure flap on a filter frame, and place a support on the flap in spaced relation to the hinged end of the flap to provide sufficient leverage for lifting the flap with ease and so as not to injure a filter element which engages the support and lifts the flap as the filter element is moved into place in the frame.

The invention is illustrated in the drawings in which—

Figure 1 is a side view, and

Figure 2 is a front view of an arrangement for automatically closing a passage from which a dust filter is removed as for cleaning purposes.

Similar character of references indicate corresponding parts.

In Figures 1 and 2 a constructional form of the filter bay is shown by which the uncleaned air is prevented from passing through openings from which individual cells have been removed.

To this end flaps are provided which are normally raised and so as to allow the air to pass without hindrance, but which drop automatically and form air-tight seals and prevent the passage of uncleaned air when the particular filter call is removed.

A series of filter cells are arranged, in Figure 2, four are shown, and in the side view of Figure 1, two are shown. These cells 10, each consist of frame 11, with a front wall 12, rear wall 13, and filtering material therebetween, preferably as shown in my application Serial No. 435,288, filed by me in the U. S. Patent Office on January 5, 1921.

At the front of these cells 10, the flaps 15 hinged at 16, are arranged, and these flaps have a circularly shaped support 17 secured at 18 thereto. When the filter cells are in position these supports 17 abut against the filter cells, and thereby the flaps are held in open position preferably in the horizontal position as shown, or at least in such a position, that the front of the filter cells are entirely exposed to the atmosphere. When, however, a filter cell is removed, as for cleaning or replacement then the abutment being removed, the support 17, having no resistance, has a free passage and the flap will drop, and thereby close up the entire front opening 20 of the cell supporting frame 19. This closure prevents uncleaned air from entering the room where only cleansed air is desired. By the arrangement of such automatically closing flaps, a very simple filter cell frame closure is provided.

From the foregoing it will be seen that when the flaps are closed the pressure of the air passing through the other cells will introduce a sufficient pressure of the air against the closed flap and hold it tightly against its frame so as to dust-proof close the opening of the filter that has been removed. It will also be seen that the flaps may automatically drop but this is not essential as they can be moved by hand. Instead of providing hinged flaps, which are always in a fixed position, flaps can be arranged otherwise, as by bayonet joints arranged along the sides of the filters or any other suitable known means or in some cases no means at all since the pressure of the air will hold the flap tightly against the opening. In large installations only several flaps may be provided since such installations have a large reserve of filter units. The flaps themselves form independent units so as to be interchangeable from opening to opening of the filter supporting wall as shown in the drawings. The essential feature being that a wall is provided which has openings to accommodate the unit filters and that such openings are closed by dust-proof flaps while a filter unit is taken out to be cleaned or substituted by another so as to prevent the flow of air through the vacant filter unit gap.

This is a divisional application of my co-pending application Serial No. 435,288, filed January 5, 1921.

I claim:

1. In a filter, a frame adapted to removably receive in one side a standardized filter element, a flap hinged to the top of the frame at the opposite side thereof for closing the frame when the filter element is removed, and a curved support secured to the inner side of the flap and adapted to swing through the frame and into the filter element space when the flap is closed, said support being adapted to be engaged and pushed outwardly by a standardized filter element as the latter is fitted in the frame to swing the flap upwardly into open position.

2. In a filter, a frame adapted to removably receive a standardized filter element in one side thereof, a flap hinged to the top of the frame at its opposite side for closing the frame when the filter element is removed, and a support secured to the inner side of the flap in spaced relation to the hinged portion thereof and projecting toward the frame to swing therethrough and into the filter element space when the flap is closed, said support being adapted to be engaged and pushed outwardly by a standardized filter element as the latter is fitted in the frame to swing the flap upwardly into open position.

In testimony that I claim the foregoing as my invention I have signed my name hereunder.

HANS WITTEMEIER.